3,238,092
MOLLUSCICIDES AND PREPARATION THEREOF
Clive Beresford Challis Boyce, Herne, Trevor John Willcox, Bredgar, near Sittingbourne, Thomas William Tyssul Jones, Pluckley, near Ashford, and Willem Andries van Tongeren, Herne Bay, Kent, England, assignors to Shell Oil Company, New York, N.Y., a corporation of Delaware
No Drawing. Filed Sept. 24, 1962, Ser. No. 225,885
Claims priority, application Great Britain, Sept. 29, 1961, 35,237/61
7 Claims. (Cl. 167—30)

This invention relates to a method of combatting molluscs, particularly snails of the genera Oncomelania, Australorbis and Bulinus, which are schistosome intermediate hosts, and snails of the genera Lymnaea, which are intermediate hosts for the liver fluke worm, and to a method of reducing the incidence of Bilharziasis and Fascioliasis which comprises treating said molluscs, or their habitat, or both molluscs and their habitat with molluscicidal compound as hereinafter specified, or with a composition containing said compound. Further, the invention relates to compositions comprising said molluscicidal compounds for use in combatting said molluscs.

The molluscicidal compound used, according to the invention, in combatting molluscs is a diphenylmethylamine derivative of the general formula

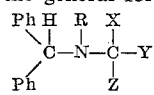

or a salt thereof, wherein:

Ph represents a phenyl group,
R represents a hydrogen atom, an alkyl group of 1 to 4 carbon atoms, or a cyanomethyl group,
X represents a hydrogen atom or a methyl group,
Y represents a hydrogen atom, an alkyl group of 1 to 7 carbon atoms, or a phenyl group,
Z represents an alkyl group of 1 to 4 carbon atoms, or a phenyl group which may be unsubstituted or nuclear substituted by at least one chlorine atom or nitro, methyl or methoxy group, the groups X, Y and Z containing a total of at least 3 carbon atoms, or Z represents a group linked to the nitrogen atom with which it completes a heterocyclic ring containing one or more heteroatoms.

The higher alkyl groups which R, Y or Z represent may have straight or branched chains.

The salts which may be used may be salts of inorganic acids, for example hydrochloric or hydrobromic acid, nitric acid, sulphuric acid or phosphoric acid, or they may be salts of organic acids, for example, of formic acid, acetic acid, aliphatic or aromatic sulphonic acids, such as isethionic acid or benzene sulphonic acid, or of picric acid.

In Table I are summarized the results of tests carried out with the above compounds to test their efficiency as molluscicides. In these tests 4 replicates of five adult snails were exposed for 24 hours to an aqueous solution or dispersion of the toxicant. The snails were then rinsed in fresh water and kept in fresh water for 24 hours. At the end of this time mortality counts were made.

TABLE I

| | | | | Percent mortality of *Australorbis glabratus* at concentrations of amine in ppm | | | | | | |
|---|---|---|---|---|---|---|---|---|---|---|
| R | X | Y | Z | 20 | 10 | 5 | 2 | 1 | 0.5 | 0.25 |
| H | H | Me | Me | 0 | | | | | | |
| H | H | Me | Et | 60 | 0 | | | | | |
| H | H | H | CH(Et)(Bu$^n$) | 100 | 20 | | | | | |
| H | H | Bu$^n$ | Bu$^n$ | 100 | 100 | 100 | 100 | 80 | 40 | |
| H | Me | Me | Me | 100 | 100 | | | | | |
| H | H | Me | Bu$^i$ | 100 | 100 | 0 | | | | |
| H | H | H | CHMe$_2$ | 20 | 0 | | | | | |
| H | H | H | (CH$_2$)$_2$Me | 80 | 0 | | | | | |
| H | H | H | Ph | | | | 100 | 100 | 100 | 100 |
| Me | H | H | Ph | | | | 40 | 60 | 40 | |
| CH$_2$CN | H | H | Ph | 100 | 100 | 100 | 100 | 100 | 0 | |
| Bu$^n$ | H | H | (CH$_2$)$_2$Me | 100 | 100 | 100 | | | | |
| Bu$^i$ | H | H | CHMe$_2$ | 100 | 0 | 0 | | | | |
| H | H | H | Ph | | 100 | 0 | 0 | | | |
| H | H | Me | Ph | | | | | 100 | | |
| H | H | Et | Ph | | | | | | 100 | |
| H | H | Pr$^n$ | Ph | | | | | | | 100 |
| H | H | Pr$^i$ | Ph | | | | | | | 100 |
| H | H | Bu$^n$ | Ph | | | | | | | 100 |
| H | H | C$_7$H$_{15}$$^n$ | Ph | | 100 | | | | | |
| H | H | H | Pentachlorophenyl | | 100 | 0 | | | | |
| H | H | H | p-Chlorophenyl | | 100 | 100 | 0 | | | |
| H | H | H | 2,6-dichlorophenyl | | 100 | 60 | 0 | | | |
| H | H | Me | p-Chlorophenyl | | 100 | 60 | 40 | | | |
| H | H | H | p-Nitrophenyl | | 100 | 100 | 0 | | | |
| H | H | Me | p-Tolyl | | 100 | 60 | 0 | | | |
| H | H | Me | p-Methoxyphenyl | | 100 | 100 | 0 | | | |
| H | H | H | Benzyl | | 100 | 100 | | | | |
| | H | H | NR(CXY) Z=piperidyl | | 100 | 100 | | | | |
| | H | H | NR(CXY) Z=morpholinyl | | 100 | 100 | | | | |

The aqueous solutions or dispersions used in these tests were prepared as follows:

The amine or amine salt (10 mg.) was dissolved in 1 ml. of acetone containing 8 mg. of isooctyl phenyl polyethoxy ethanol as emulsifier and the resulting solution was made up to 500 ml. with water. The aqueous solution or dispersion so obtained contained 20 parts per million (p.p.m.) of amine or amine salt, 16 p.p.m. of isooctyl phenyl polyethoxy ethanol and 1600 p.p.m. of acetone. This was diluted with water to give solutions or dispersions containing lower concentrations of the amine or amine salt.

It can be seen that in compounds of the above general formula in which R represents a hydrogen atom and Y and/or Z each represent an alkyl group, molluscicidal activity increases with increasing size or the alkyl groups. An increase in activity occurs when the total number of carbon atoms in the alkyl groups which X, Y and Z represent is at least three, the di-n-butyl derivative causing 100% mortality at a concentration of 2 p.p.m. and 80% mortality at 1 p.p.m. N-(diphenylmethyl)-di-n-butylmethylamine is therefore a preferred compound for use according to the invention. Still higher molluscicidal activity is exhibited by compounds of the above general formula in which R and X each represent a hydrogen atom, Y represents an alkyl group of 3 or 4 carbon atoms or a phenyl group and Z represents a phenyl group, 100% mortality being obtained with concentrations of as low as 0.25 p.p.m. with N-(diphenylmethyl)-α-n-propylbenzylamine and the corresponding isopropyl and n-butyl derivatives and with bis(diphenylmethyl)amine. These are therefore preferred compounds for use in accordance with the invention.

In areas where fishery interests are of prime importance, the molluscicidal compound used should preferably be non-toxic or of only low toxicity to fish. The toxicity of some of the more active molluscicidal compounds to fish was therefore determined. The following method was employed:

Aqueous dispersions containing various concentrations of the amine were prepared as described above. Two male and two female guppies (*Lebistes reticulatus*) were exposed for 24 hours to each concentration of the amine and were then transferred to fresh water to observe mortality. The tests were carried out in duplicate.

In Table II, the concentration LC 100 of compound in p.p.m. required to cause 100% mortality of snails and of fish and the snail: fish toxicity ratio are given. This ratio is an indication of the size of the safety factor which can be expected in practice.

TABLE II

| Ph H R H \C—N—C—Y / \| Ph Ph | LC 100 (ppm) | | Snail:Fish, toxicity ratio |
|---|---|---|---|
| | Snail | Fish | |
| H | 10 | 5 | 0.5 |
| Me | 1 | 2 | 2 |
| Et | 0.5 | 1 | 2 |
| Pr$^n$ | 0.25 | 0.25 | 1 |
| Bu$^n$ | 0.25 | 2 | 8 |
| Ph | 0.25 | 80 | 320 |

It can readily be appreciated that N-(diphenylmethyl)-α-methylbenzylamine and the corresponding-α-ethyl derivative with snail:fish toxicity ratios of 2 are very suitable compounds for use as molluscicides in fishery areas since twice the concentration causing 100% mortality of snails is required to cause 100% mortality of fish. The corresponding α-n-butyl derivative is particularly suitable since its snail:fish toxicity ratio is 8, that is, eight times the concentration causing 100% mortality of snails is required to give 100% mortality of fish. There is therefore a very considerable safety margin. Bis-(diphenylmethyl)-amine is also a very suitable compound to use as a molluscicide in fishery areas since it has a snail:fish toxicity ratio of approximately 300, thus providing a very high safety margin. Compounds having relatively high fish toxicity, such as diphenylmethylbenzylamine and diphenylmethyl α-n-propylbenzylamine may, if desired, be used as piscicides.

In Table III, molluscicidal activity and fish toxicity of bis-(diphenylmethyl)amine and its salts are compared. It can be seen that there is substantially no difference between the free base and its salts in molluscicidal activity.

TABLE III

| | Percent mortality of of *A. glabratus* at concentrations of toxicant in ppm | | | Concentration of toxicant in ppm required to give 100% mortality of fish |
|---|---|---|---|---|
| | 2 | 1 | 0.5 | |
| (Ph$_2$CH)$_2$NH | 100 | 100 | *100 | >80 |
| (Ph$_2$CH)$_2$NH.picrate | 100 | 100 | *100 | >20 |
| (Ph$_2$CH)$_2$NH.HCl | 100 | 100 | *100 | >20 |
| (Ph$_2$CH)$_2$NH.HBr | 100 | 100 | *100 | |
| (Ph$_2$CH)$_2$NH.HNO$_3$ | 100 | 100 | *100 | |

*These compounds have sometimes given incomplete kills at 0.5 ppm but have given complete kills at 0.25 ppm.

The compounds used according to the method of this invention are prepared by reacting a diphenylhalomethane of formula Ph$_2$CH.Hal with an amine of formula HRNCXYZ, or reacting the amine Ph$_2$CHNHR with a halide of formula HalCXYZ, wherein Hal represents a halogen atom and R, X, Y and Z have the aforesaid meanings, in presence of a hydrogen halide acceptor and of an inert solvent. The halogen present in said reactants may be chlorine, bromine or iodine, chlorine or bromine being preferred.

While aromatic hydrocarbons such as benzene or toluene may be used as the solvent, it has been found that improved yields and a more rapid reaction rate are obtained if an inert polar solvent is used. Acetonitrile is a particularly suitable solvent for this purpose. Acetone, dimethylformamide or nitromethane may also be used.

Hydrogen halide acceptors which are suitable for use in the process of the invention are the tertiary nitrogenous bases such as pyridine and triethylamine, triethylamine being preferred. The alkali and alkaline earth metal carbonates and bicarbonates are less satisfactory as they tend to cause undesirable side reactions.

For optimum results, the above reaction should be effected in an inert polar solvent, particularly acetonitrile, and in presence of a tertiary nitrogenous base, preferably triethylamine.

The process is suitably carried out at a temperature in the range of 50° to 120° C. though temperatures above or below this range may be employed if desired. Preferably, the process is effected at a temperature in the range 70° to 90° C., when reaction times of 1 to 4 hours in general suffice.

At the end of the reaction period, the mixture is cooled and filtered to remove precipitated halide formed during the reaction. If necessary, an inert solvent such as ether or benzene is added to the reaction mixture to facilitate precipitation of the halide. The filtrate may then be washed with water to remove any remaining halide, dried and the solvent removed. Alternatively, where the desired product is a solid and a water-miscible solvent has been used in the reaction, the product may be obtained by simple dilution with water. The product thus obtained may be distilled under reduced pressure or, if solid, may be recrystallized from a solvent.

Alternatively, compounds of the above general formula may be prepared by condensing benzophenone Ph$_2$C=O with an amine of formula H$_2$NCXYZ, or by condensing diphenylmethylamine Ph$_2$CHNH$_2$ with a ketone of formula O=CXYZ, X, Y and Z having the aforesaid meanings, in an inert solvent in presence of a condensation catalyst, the water of reaction being continuously removed from the reaction mixture, and subsequently reducing the resultant imine to the corresponding amine.

Any condensation catalyst used in the condensation of ketones with amines may be used, good results being obtained with anhydrous zinc chloride.

The inert solvent used is preferably one which forms an azeotrope with water and for this purpose, aromatic hydrocarbon solvents such as toluene or xylene are particularly suitable. The reaction water may then be removed by azeotropic distillation with the solvent.

The reaction is suitably effected by heating the reaction mixture under reflux until water is no longer produced. The solvent is then removed, preferably under reduced pressure, leaving a crystalline residue of the imine. This is collected and is preferably washed with a light petroleum fraction or with hexane prior to hydrogenation.

Hydrogenation may be effected by any method employed for reduction of imines, for example, sodium amalgam in ethanol, or with hydrogen in presence of a platinum or Raney nickel catalyst.

The following examples illustrate the preparation of compounds used in the method of the invention and their use. In the examples, parts by weight w. and parts by volume v. bear the same relation as the kilogram and the litre.

*Example I.—Preparation of N-(diphenylmethyl)-di-n-butyl-methylamine*

$$Ph_2CHNHCH(C_4H_9)_2$$

Diphenylbromomethane (24.7 w.), di-n-butylmethylamine (14.3 w.) and triethylamine (10.1 w.) in 20 v. acetonitrile were boiled under reflux for 45 minutes. The cooled mixture was diluted with water and then extracted with ether and the ether extract washed with water and dried over magnesium sulphate. The ether was removed and the residue purified by distillation. The fraction boiling 148° to 152° C. under 0.6 mm. pressure was collected.

*Analysis.*—Found: C, 85.9%; H, 9.6%; N, 4.8%. $C_{22}H_{31}N$ requires: C, 85.4%; H, 10.0%; N, 4.5%.

In a similar way were prepared the following:

*Example II.—N-(diphenylmethyl)-α-n-propyl benzylamine*

$$Ph_2CHNHCHPr^nPh$$

obtained as a viscous oil boiling at 150° to 152° C. under 0.01 mm. pressure. Yield 72%.

*Analysis.*—Found: C, 87.1%; H, 7.8%; N, 4.7%. $C_{23}H_{25}N$ requires: C, 87.6%; H, 7.9%; N, 4.5%.

*Example III.—N-(diphenylmethyl)-α-isopropyl-benzylamine*

$$Ph_2CHNHCHPr^iPh$$

obtained as a viscous oil boiling at 180° to 190° C. under 1.5 mm. pressure. Yield 58%.

*Analysis.*—Found: C, 87.1%; H, 7.8%; N, 4.3%. $C_{23}H_{25}N$ requires: C, 87.6%; H, 7.9%; N, 4.4%.

*Example IV.—N-(diphenylmethyl)-α-ethylbenzylamine*

$$Ph_2CHNHCHEtPh$$

obtained as a viscous oil boiling at 160° to 162° C. under 0.6 mm. pressure. Yield 87%.

*Analysis.*—Found: C, 87.8%; H, 7.6%; N, 4.7%. $C_{22}H_{23}N$ requires: C, 87.7%; H, 7.7%; N, 4.7%.

*Example V.—N-(diphenylmethyl)-α-n-butylbenzylamine*

$$Ph_2CHNHCHBu^nPh$$

obtained as a viscous pale yellow oil boiling at 184° to 186° C. under 0.007 mm. pressure. Yield 67%.

*Analysis.*—Found: C, 87.7%; H, 8.3%; N, 4.1%. $C_{24}H_{27}N$ requires: C, 87.5%; H, 8.2%; N, 4.2%.

*Example VI.—N-(diphenylmethyl)-1-phenyl-n-octylamine*

$$Ph_2CHNHCHPh \atop C_7H_{15}$$

obtained as a viscous oil boiling at 194° to 196° C. under 0.01 mm. pressure. Yield 60%.

*Analysis.*—Found: C, 87.7%; H, 8.3%; N, 3.9%. $C_{27}H_{33}N$ requires: C, 87.3%; H, 8.9%; N, 3.8%.

*Example VII.—N-(diphenylmethyl)-α-p-tolylethylamine*

$$Ph_2CHNHCH{-}C_6H_4{-}CH_3 \atop CH_3$$

obtained as a very viscous colorless oil boiling at 181° C. under 1.2 mm. pressure.

*Analysis.*—Found: C, 86.8%; H, 7.6%; N, 5.0%. $C_{22}H_{23}N$ requires: C, 87.6%; H, 7.6%; N, 4.6%.

*Example VIII.—N-(diphenylmethyl)-p-methoxy-phenylethylamine*

$$Ph_2CHNHCH{-}C_6H_4{-}OCH_3 \atop CH_3$$

obtained as a colorless oil boiling at 172° C. under 0.2 mm. pressure. Yield 78%.

*Analysis.*—Found: C, 83.2%; H, 7.0%; N, 4.6%. $C_{22}H_{23}NO$ requires: C, 83.3%; H, 7.2%; N, 4.4%.

*Example IX.—Preparation of N-(diphenylmethyl)-4-chlorobenzylamine*

$$Ph_2CHNHCH_2{-}C_6H_4{-}Cl$$

A solution of benzhydrylamine (9.15 w.), p-chlorobenzyl chloride (8.05 w.) and triethylamine (5.05 w.) in acetonitrile (50 w.) was boiled for 4 hours under the reflux. The solvent was distilled off and the residue extracted with 200 v. ether. The ether was removed, finally under 0.1 mm. pressure. The sweet-smelling oily residue then solidified and was crystallized from ethanol to give 5.0 w. of product melting at 55° to 56° C. Yield 32%.

*Analysis.*—Found: C, 77.8%; H, 6.0%; N, 5.1%; Cl, 11.9%. $C_{20}H_{18}NCl$ requires: C, 78.1%; H, 5.9%; N, 4.6%; Cl, 11.5%.

*Example X.—N-(diphenylmethyl)2,6-dichlorobenzylamine*

$$Ph_2CHNHCH_2{-}C_6H_3Cl_2$$

was prepared by a method similar to that of Example IX. The residue was recrystallized from light petroleum (B.P. 80°–100° C.) to give a product melting at 59.5° to 60° C. Yield 63%.

*Analysis.*—Found: C. 69.9%; H, 4.9%; N, 4.1%; Cl, 20.3%. $C_{20}H_{17}Cl_2N$ requires: C, 70.2%; H, 5.0%; N, 4.1%; Cl, 20.7%.

*Example XI.—Preparation of bis-(diphenylmethyl)amine*

A mixture of benzophenone (182 w.), diphenylmethylamine (183 w.), zinc chloride (1 w.) and dry xylene (1000 v.) was heated under reflux for 24 hours, the reaction water being removed by means of a Dean and Stark apparatus. The reaction mixture was then concentrated under reduced pressure (water pump) and the crystalline residue collected and washed with hexane. The imine so obtained (270 w., 78% yield) had M.P. 148° to 150° C.

The imine (349 w.) in solution in ethanol (1000 v.) was heated under reflux for 2 hours with sodium amalgam containing 3% w. of sodium (46 w. sodium). The mixture was then cooled, filtered and the filtrate evaporated to dryness giving the desired amine in 80% yield.

In the method of the invention, molluscicidal compositions comprising a diphenylmethylamine derivative, or salt thereof, as hereinbefore specified, as the active ingredient or ingredients, together with a solid or liquid carrier or a surface active agent, or a solid or liquid carrier and a surface active agent, are preferably used. These compositions are a further feature of the invention, known solutions being excluded therefrom.

Aqueous dispersions in which the particles of amine or amine salt are 5 microns or less in diameter, preferably less than 1 micron in diameter, and more particularly of colloidal dimensions, exhibit particularly high molluscicidal activity. Such dispersons may be prepared by any suitable method known in the art. A particularly suitable method comprises pouring a concentrated solution comprising the amine or amine salt and a hydrophilic dispersing agent in a water-miscible solvent into water, for example, into the water of the river, pond, irrigation canal etc. to be treated. These solutions and the aqueous dispersions obtained on diluting them with water are preferred compositions of the invention. The water-miscible solvent, may for example, be a water soluble aliphatic ketone such as acetone or methyl ethyl ketone, a water-soluble alcohol such as methyl, ethyl or isopropyl alcohol, dimethylformamide or ethyl oxitol. The dispersing agent suitably constitutes 5 to 20 percent by weight of the solution and preferably 5 to 10 percent by weight thereof. On pouring this solution into water, an opalescent dispersion is obtained in which the amine or amine salt is present in colloidal form. These opalescent dispersions are highly toxic to water snails. It is particularly advantageous to apply bis-(diphenylmethyl)amine in the form of such opalescent dispersions. The dispersing agent used may be non-ionic, for example, polyalkylene oxide condensation products of alkylphenols such as the condensation product of octylphenol with 8 or 10 molecular proportions of ethylene oxide, or ionic, for example, sodium salts of secondary alkyl sulphuric acid esters containing 10 to 20 carbon atoms in the alkyl group, or sodium sulphonates of the above polyalkylene oxide condensation products or salts (particularly calcium salts) of alkyl aryl sulphonates such as calcium dodecylbenzene sulphonate. Mixtures of non-ionic and ionic dispersing agents may also be used.

The compositions of the invention may also be emulsifiable concentrates comprising a solution or dispersion of the amine or amine salt in a water-immiscible organic liquid and an emulsifying agent. These compositions form more or less stable emulsions on addition to water. The water-immiscible organic liquid used may be, for example, a hydrocarbon for example, toluene, xylene, a mineral oil, for example kerosene, or a petroleum horticultural spray oil or a chlorinated hydrocarbon, for example a chlorinated benzene, carbon tetrachloride or trichloroethylene. The emulsifying agent may be of the types described above.

The compositions of the invention may also be wettable powders comprising the amine or amine salt in finely divided form and a dispersing agent, or a dispersing agent and a wetting agent. Suitable dispersing agents are, for example, the sodium or calcium salts of lignin sulphonic acids or of polyacrylic acids. Suitable wetting agents are, for example, the alkali metal, particularly sodium, salts of alkyl sulphuric acid esters, alkyl sulphonic acids or alkyl benzene sulphonic acids containing 8 to 18 carbon atoms in the alkyl group, of petroleum sulphonic acids, of N-methyl-N-oleyltauric acid or of dioctylsulphosuccinic acid. A finely divided solid adsorbent carrier for example, adsorbent clay or synthetic silica, may be incorporated in the composition. If there is danger that the carrier employed may affect adversely the stability of the amine or amine salt during storage of the wettable powder, it may be desirable to incorporate a stabilizing agent, for example, ethanolamine, quaternary ammonium compounds, urea, hexamethylene tetramine, phenols, naphthols or chelating agents such as alkali metal salts of ethylene diamine tetra-acetic acid. Advantageously the composition is prepared by passing the ingredients through an air jet mill so that the particles are not more than 5 microns and preferably not more than 1 to 2 microns in diameter.

The compositions of the invention may also be in the form of granules, pellets, tablets, blocks or thin sheets comprising the compound and a solid carrier. These may be prepared by impregnating an absorbent carrier such as porous tiles, clay granules or fibrous material such as paper or cloth, with a solution of the amine or salt, or a mixture of the amine or salt and a finely divided absorbent carrier may be granulated or pelleted by methods well known in the art. A thermoplastic or fusible resinous carrier may also be used in making these compositions. Thus, the amine or amine salt may be dissolved in the molten resinous carrier and the mixture subsequently granulated or pelleted. Alternatively, a resinous carrier which is soluble in an organic solvent may be used, the compound being dissolved in the solution of the resin, the solvent then evaporated and residue granulated. These compositions may be used against either aquatic or terrestrial molluscs.

Preferably, the compositions of the invention are used in conjunction with, or have incorporated in them, an attractant or bait for the mollusc. A particularly effective attractant or bait is material containing one or more of the various vitamin B's, for example, bran, or liver. One or more synthetic or isolated vitamin B's or amino acids may be incorporated.

The toxicant suitably constitutes 0.25 to 1 percent by weight of the attractant or bait though lower or higher concentrations may be used if desired.

The compositions of the invention containing no attractant or bait are preferably used so that when dispersed in water from 0.25 to 1.0 percent by weight of the amine or amine salt is present per million parts of water, though higher concentrations may be used if desired. A fundamental advantage of the compositions comprising a bait in addition to the amine or amine salt is that the content of toxicant is not related to the volume of water to which the composition is applied.

We claim as our invention:

1. A method of combatting molluscs which comprises treating said molluscs with a member of the group consisting of a diphenylmethylamine of the formula

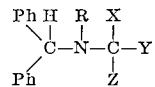

and salts thereof, wherein:

Ph represents phenyl,

R represents a member selected from the group consisting of hydrogen, alkyl of 1 to 4 carbons and cyanomethyl;

X represents a member selected from the group consisting of hydrogen and methyl;

Y represents a member selected from the group consisting of hydrogen, alkyl of 1 to 7 carbons and phenyl;

Z represents a member selected from the group consisting of alkyl of 1 to 4 carbons, unsubstituted phenyl, nuclear substituted phenyl, substituted with a member selected from the group consisting of chlorine, nitro, methyl and methoxy, with the proviso that the groups X, Y and Z contain a total of at least 3 carbon atoms.

2. A method as claimed in claim 1 wherein said molluscs are snails of the genera Oncomelania, Australorbis, Bulinus and Lymnaea.

3. A method of reducing the incidence of Bilharziasis and Fascioliasis, which comprises treating snails of the genera Oncomelania, Australorbis, Bulinus and Lymnaea respectively, with a diphenylmethylamine as claimed in claim 1.

4. A method as claimed in claim 1 wherein X represents hydrogen, Y represents alkyl of 1 to 4 carbon atoms, Z represents phenyl and R represents hydrogen.

5. A method of combatting molluscs which comprises treating said molluscs with a diphenylmethylamine of the formula

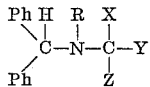

and salts thereof, wherein:

Ph represents phenyl,

R represents a member selected from the group consisting of hydrogen, alkyl of 1 to 4 carbons and cyanomethyl;

X represents a member selected from the group consisting of hydrogen and methyl;

Y represents a member selected from the group consisting of hydrogen, alkyl of 1 to 7 carbons and phenyl;

Z represents a member selected from the group consisting of alkyl of 1 to 4 carbons, unsubstituted phenyl, nuclear substituted phenyl, substituted with a member selected from the group consisting of chlorine, nitro, methyl and methoxy, with the proviso that the groups X, Y and Z contain a total of at least 3 carbon atoms, together with a carrier and surface active agent.

6. A method of combatting molluscs which comprises treating said molluscs with a molluscidally effective amount of N-(diphenylmethyl)-di-n-butylmethylamine.

7. A method of combatting molluscs which comprises treating said molluscs with a molluscidally effective amount of N-(diphenylmethyl)-α-n-propylbenzylamine.

References Cited by the Examiner

UNITED STATES PATENTS

| | | | |
|---|---|---|---|
| 2,276,587 | 3/1942 | Mettler et al. | 260—457 |
| 2,278,559 | 4/1942 | Paul | 167—30 |
| 2,655,498 | 10/1953 | Weston et al. | 260—239 |
| 2,738,347 | 3/1956 | Bernstein et al. | 260—570.8 |
| 2,782,234 | 2/1957 | Rorig | 260—510 |
| 2,797,242 | 6/1957 | Edgerton et al. | 260—570.8 |
| 2,834,706 | 5/1958 | Fulton et al. | 167—30 |
| 2,938,830 | 5/1960 | Davey et al. | 167—30 |
| 2,983,756 | 5/1961 | Kranz | 260—510 |

FOREIGN PATENTS 760,038   10/1956   Great Britain.

OTHER REFERENCES

Am. Soc. Testing Materials, Spec. Tech. Publ. No. 275, 1960, p. 16.

JULIAN S. LEVITT, *Primary Examiner.*

CHARLES B. PARKER, *Examiner.*